(12) United States Patent
Don, Jr. et al.

(10) Patent No.: US 9,319,382 B2
(45) Date of Patent: Apr. 19, 2016

(54) SYSTEM, APPARATUS, AND METHOD FOR PROTECTING A NETWORK USING INTERNET PROTOCOL REPUTATION INFORMATION

(71) Applicant: Cautela Labs, Inc., Orange, CA (US)

(72) Inventors: Eduardo Don, Jr., Covina, CA (US); Neeraj Gupta, Irvine, CA (US); Frank Landberg, Monterey Park, CA (US); John Sturges, Phoenix, AZ (US)

(73) Assignee: Cautela Labs, Inc., Orange, CA (US)

( * ) Notice: Subject to any disclaimer, the term of this patent is extended or adjusted under 35 U.S.C. 154(b) by 0 days.

(21) Appl. No.: 14/798,360

(22) Filed: Jul. 13, 2015

(65) Prior Publication Data

US 2016/0014081 A1 Jan. 14, 2016

Related U.S. Application Data

(60) Provisional application No. 62/024,341, filed on Jul. 14, 2014.

(51) Int. Cl.
| | |
|---|---|
| *H04L 29/06* | (2006.01) |
| *H04L 29/08* | (2006.01) |
| *G06F 9/00* | (2006.01) |
| *G06F 15/16* | (2006.01) |
| *G06F 17/00* | (2006.01) |

(52) U.S. Cl.
CPC ............ *H04L 63/0236* (2013.01); *H04L 67/02* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 7,849,502 B1 * | 12/2010 | Bloch | ................. H04L 12/2602 726/11 |
| 8,561,187 B1 | 10/2013 | Hegli | |
| 8,566,932 B1 | 10/2013 | Hotta et al. | |
| 8,627,469 B1 | 1/2014 | Chen et al. | |
| 8,650,245 B1 | 2/2014 | Ashley | |
| 8,695,092 B2 | 4/2014 | Manianchira et al. | |
| 8,719,939 B2 | 5/2014 | Krasser et al. | |

(Continued)

OTHER PUBLICATIONS

"Web Threats: Challenges and Solutions" by Trend Micro Inc. dated Mar. 2008 in 19 pages.

(Continued)

*Primary Examiner* — Shin-Hon Chen
(74) *Attorney, Agent, or Firm* — Knobbe, Martens, Olson & Bear LLP

(57) ABSTRACT

Certain embodiments described herein provide a computer system, a log collection device, and methods for protecting a plurality of guarded networks from internet threats. The computer system includes at least one processor in operative communication with a plurality of log collection circuits via the internet and in operative communication with a plurality of intelligence sources via the internet. The log collection circuit includes at least one processor in operative communication with a computer system via the internet and in operative communication with at least one firewall of the guarded network. The at least one processor of the computer system is operative to receive traffic information from each log collection circuit of the plurality of log collection circuits, to receive intelligence data from the plurality of intelligence sources, to generate reputation information regarding one or more addresses of the plurality of addresses, and to transmit the reputation information to each log collection circuit of the plurality of log collection circuits.

20 Claims, 7 Drawing Sheets

(56) References Cited

U.S. PATENT DOCUMENTS

| | | | |
|---|---|---|---|
| 2005/0120229 A1 | 6/2005 | Lahti | |
| 2007/0266435 A1* | 11/2007 | Williams | G06F 21/54 726/22 |
| 2008/0082662 A1* | 4/2008 | Dandliker et al. | 709/225 |
| 2009/0063371 A1 | 3/2009 | Lin | |
| 2012/0023583 A1 | 1/2012 | Sallam | |
| 2012/0030302 A1 | 2/2012 | Lund et al. | |
| 2012/0102545 A1 | 4/2012 | Carter, III et al. | |
| 2013/0111547 A1 | 5/2013 | Kraemer | |
| 2013/0139245 A1* | 5/2013 | Thomas | H04L 63/0227 726/13 |
| 2014/0123279 A1* | 5/2014 | Bishop et al. | 726/23 |
| 2014/0130161 A1 | 5/2014 | Golovanov | |
| 2014/0173723 A1* | 6/2014 | Singla et al. | 726/22 |
| 2014/0201836 A1 | 7/2014 | Amsler | |
| 2014/0289853 A1 | 9/2014 | Teddy et al. | |
| 2015/0020219 A1* | 1/2015 | Yost et al. | 726/29 |
| 2015/0207809 A1* | 7/2015 | Macaulay | 726/22 |

OTHER PUBLICATIONS

Reputation Digital Vaccine Service Report by TippingPoint dated Apr. 2010 in 4 pages.

"Cloud-based Web Security Isn't Hype: It's Here and It Works" by Watch Guard Technologies dated Jun. 2010 in 7 pages.

* cited by examiner

SYSTEM, APPARATUS, AND METHOD FOR PROTECTING A NETWORK USING INTERNET PROTOCOL REPUTATION INFORMATION

CROSS-REFERENCE TO RELATED APPLICATIONS

This application claims the benefit of priority to U.S. Provisional Appl. No. 62/024,341, filed on Jul. 14, 2014 and incorporated in its entirety by reference herein.

BACKGROUND

1. Field

This application is generally directed to systems, apparatus, and methods for protecting computer networks from potentially harmful infiltrations by using internet protocol (IP) reputation information.

2. Description of the Related Art

Organizations desire to protect their computer infrastructure from threats that can come from anywhere, anytime. Hackers and cybercriminals have an immense number of exploits and attack vectors available to them, and they have begun using orchestrated attacks on organizations' computer infrastructure using numerous techniques to hide their identities and activities, such as encrypted communications, DNS cache poisoning, URO redirection, hyperlink obfuscation, and anonymous proxies and/or networks. Attackers now use a wealth of methods to infect innocent host computers or computer networks, and to control these infections through organized botnets (e.g., networks of automated or semi-automated programs controlled by outside entities) in order to carry out actions (e.g., probing sites, scraping Web content, posting spam messages, or attacking websites) that are unauthorized, unwanted, and/or potentially or intentionally harmful to the infected computers or computer networks or to other computers or computer networks on the internet. For example, these actions can be used to launch automated phishing, spamming, and distributed denial-of-service (DDoS) attacks on critical business applications and services.

SUMMARY

Certain embodiments described herein provide a computer system for protecting a plurality of guarded networks from internet threats. Each guarded network of the plurality of guarded networks comprises at least one firewall. The system comprises at least one processor in operative communication with a plurality of log collection circuits via the internet and in operative communication with a plurality of intelligence sources via the internet. Each log collection circuit of the plurality of log collection circuits is in operative communication with one or more firewalls of a corresponding guarded network of the plurality of guarded networks. The at least one processor is operative to receive traffic information from each log collection circuit of the plurality of log collection circuits. The traffic information is indicative of inbound communications received by the corresponding guarded network from the internet and outbound communications transmitted by the corresponding guarded network to the internet. The at least one processor is further operative to receive intelligence data from the plurality of intelligence sources. The intelligence data is regarding a plurality of addresses. The at least one processor is further operative to generate reputation information regarding one or more addresses of the plurality of addresses. The reputation information is generated in response at least to the received traffic information and at least to the received intelligence data. The reputation information is indicative of a likelihood for each address that the address is an address of a threatening source. The at least one processor is further operative to transmit the reputation information to each log collection circuit of the plurality of log collection circuits. The system further comprises at least one memory device in operative communication with the at least one processor. The at least one memory device is operative to store addresses of the plurality of log collection circuits, addresses of the plurality of intelligence sources, the received traffic information, the received intelligence data, and the reputation information.

Certain embodiments described herein provide a method for protecting a plurality of guarded networks from internet threats. Each guarded network of the plurality of guarded networks comprises at least one firewall. The method comprises receiving traffic information via the internet from each log collection circuit of a plurality of log collection circuits. Each log collection circuit of the plurality of log collection circuits is in operative communication with one or more firewalls of a corresponding guarded network of the plurality of guarded networks. The traffic information is indicative of inbound communications received by the corresponding guarded network and outbound communications transmitted by the corresponding guarded network. The method further comprises receiving intelligence data from a plurality of intelligence sources via the internet. The intelligence data is indicative of information regarding a plurality of addresses. The method further comprises generating reputation information regarding one or more addresses of the plurality of addresses. The reputation information is generated in response at least to the received traffic information and at least to the received intelligence data. The reputation information is indicative of a likelihood for each address that the address is a threatening source address. The method further comprises transmitting the reputation information to each log collection circuit of the plurality of log collection circuits.

Certain embodiments described herein provide a log collection circuit for protecting a guarded network of a plurality of guarded networks from internet threats. The guarded network comprises at least one firewall. The circuit comprises at least one processor in operative communication with a computer system via the internet and in operative communication with the at least one firewall of the guarded network. The at least one processor is operative to receive information from the at least one firewall indicative of inbound communications received by the corresponding guarded network from the internet and outbound communications transmitted by the corresponding guarded network to the internet. The at least one processor is further operative to generate inbound and outbound traffic information of the guarded network in response to the information received from the at least one firewall. The at least one processor is further operative to transmit the traffic information to the computer system. The at least one processor is further operative to receive reputation information from the computer system. The reputation information is regarding one or more addresses of a plurality of addresses. The reputation information is indicative of a likelihood for each address that the address is a threatening source address. The at least one processor is further operative to generate control information in response at least to the received reputation information. The at least one processor is further operative to transmit the control information to the at least one firewall. The circuit further comprises at least one memory device in operative communication with the at least one processor. The at least one memory device is operative to store the traffic information and the received reputation information.

Certain embodiments described herein provide a method for protecting a guarded network of a plurality of guarded networks from internet threats. The guarded network comprises at least one firewall. The method comprises receiving information from the at least one firewall indicative of inbound communications received by the corresponding guarded network from the internet and outbound communications transmitted by the corresponding guarded network to the internet. The method further comprises generating inbound and outbound traffic information of the guarded network in response to the information received from the at least one firewall. The method further comprises transmitting the traffic information to a computer system via the internet. The method further comprises receiving reputation information via the internet. The reputation information is regarding one or more addresses of a plurality of addresses. The reputation information is indicative of a likelihood for each address that the address is a threatening source address. The method further comprises generating control information in response at least to the received reputation information. The method further comprises transmitting the control information to the at least one firewall.

The paragraphs above recite various features and configurations of one or more methods, computer systems, circuits, and computer storage that have been contemplated by the inventors. It is to be understood that the inventors have also contemplated methods, computer systems, circuits, and computer storage which comprise combinations of these features and configurations from the above paragraphs, as well as methods, computer systems, circuits, and computer storage which comprise combinations of these features and configurations from the above paragraphs with other features and configurations disclosed in the following paragraphs.

BRIEF DESCRIPTION OF THE DRAWINGS

The foregoing aspects and many of the attendant advantages provided by certain embodiments described herein will become more readily appreciated as the same become better understood by reference to the following detailed description, when taken in conjunction with the accompanying drawings.

DETAILED DESCRIPTION

Figure 1:
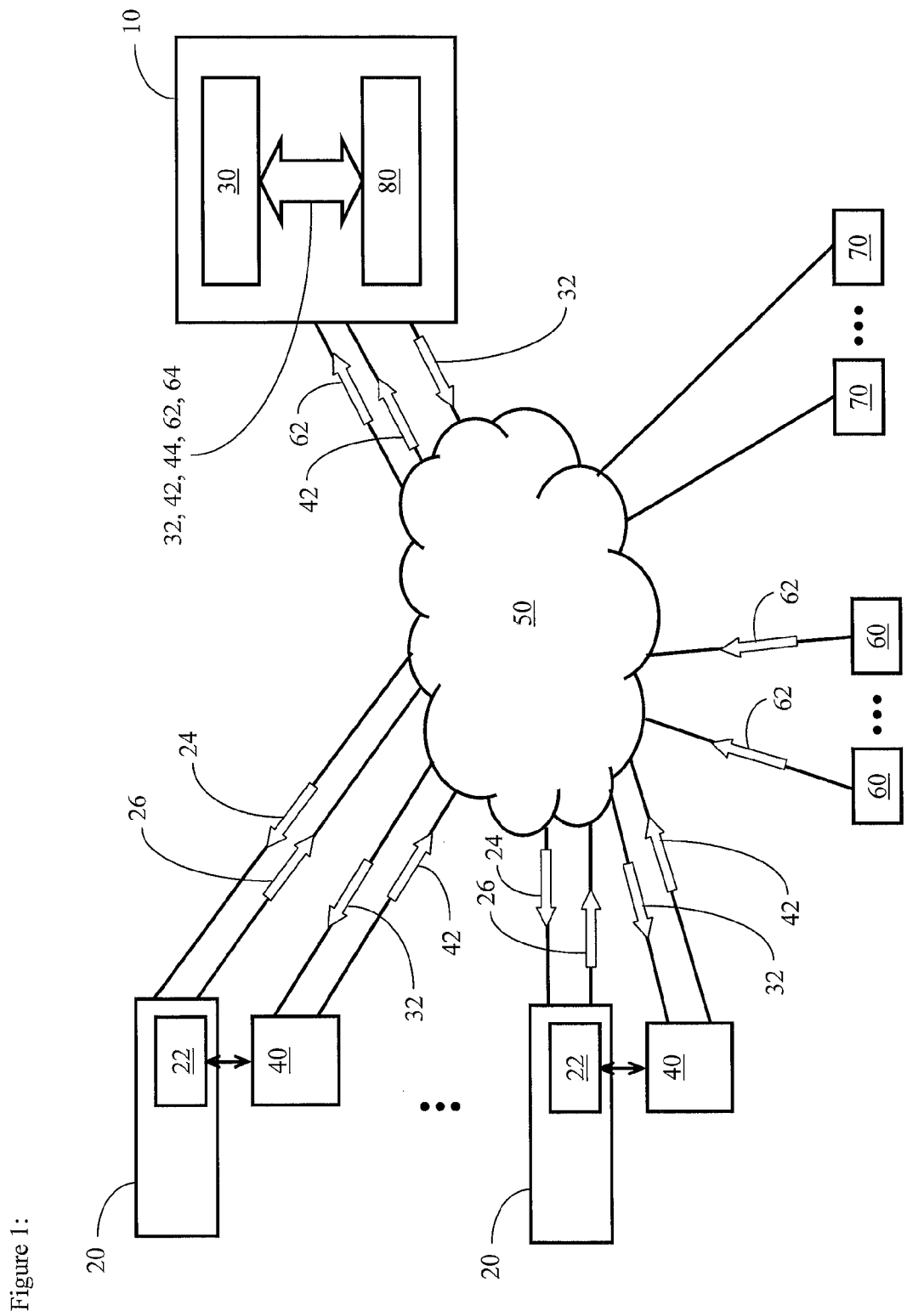
FIG. 1 schematically illustrates an example computer system (e.g., a reputation module) for protecting a plurality of guarded networks from internet threats in accordance with certain embodiments described herein.

Although commonly used terms are used to describe the systems and methods of certain embodiments for ease of understanding, these terms are used herein to have their broadest reasonable interpretation, as described in more detail herein. Although various aspects of the disclosure will be described with regard to illustrative examples and embodiments, one skilled in the art will appreciate that the disclosed embodiments and examples should not be construed as limiting.

Certain embodiments described herein include methods which are performed by computer hardware, software or both, comprising one or more modules. The hardware used for certain embodiments described herein (e.g., the computer system 10, the networks 20, the firewalls 22, the at least one processor 30, the log collection circuits 40, at least one memory device 80, etc.) can take a wide variety of forms, including processors, network servers, workstations, personal computers, mainframe computers and the like. The hardware running the software will typically include one or more input devices, such as a mouse, trackball, touchpad, and/or keyboard, a display, and computer-readable memory media, such as random-access memory (RAM) integrated circuits and a data storage device (e.g., tangible storage, non-transitory storage, flash memory, hard-disk drive). It will be appreciated that one or more portions, or all of the software code may be remote from the user and, for example, resident on a network resource, such as a LAN server, Internet server, network storage device, etc. The software code which configures the hardware to perform in accordance with certain embodiments described herein can be downloaded from a network server which is part of a local-area network or a wide-area network (such as the internet) or can be provided on a tangible (e.g., non-transitory) computer-readable medium, such as a CD-ROM or a flash drive. Various computer languages, architectures, and configurations can be used to practice the various embodiments described herein.

Threats to an organization's computer infrastructure can strike quickly and disappear, only to re-appear in another form in rapid fashion. Certain embodiments described herein advantageously provide a dynamic solution that can address these evasion techniques. If a malicious entity's machine attacks a target in one location, the rest of the global network can advantageously be used to learn and to update quickly in order to pre-empt the next wave of attacks. Certain embodiments described herein utilize the fact that every packet on the internet has a source internet protocol (IP) address and a destination IP address, by disabling inbound and outbound communications to and from IP addresses known to be malicious.

Certain embodiments described herein advantageously aggregate real-time, IP reputation information from locations and intelligence sources around the world that collaborate to provide up-to-date information about threatening sources. This information can include a list of blacklisted IP addresses that are known to be affiliated with, or that have a high likelihood of being affiliated with, threatening sources. Based on this information, commands can be delivered to a firewall of an organization's computer infrastructure to filter (e.g., inhibit, prohibit, prevent) both inbound traffic and outbound traffic from/to the threatening sources identified in the information, thereby protecting the organization's computer infrastructure from threats that include, but are not limited to:

botnets and remotely controlled hosts, keyloggers, Trojans, viruses, worms, malware, spyware, encrypted tunnels, phishing sources, zero day threats, and honeypots.

Certain embodiments described herein advantageously proactively guard systems, networks, and devices against infiltrators by identifying origins of attack and blocking them before they communicate with the systems, networks, and devices being guarded. By correlating source IP addresses of known malicious IP addresses, certain embodiments advantageously stop threats before they have a chance to enter the systems, networks, and devices being guarded.

Certain embodiments described herein utilize a continuously updated feed of known malicious IP addresses that are used to direct the organization's firewall to block potentially dangerous inbound and outbound traffic. Certain embodiments described herein capitalize on the value of utilizing the latest up-to-the-minute threat intelligence to identify and protect against security threats. The blocking of traffic can be customizable according to each organization's network environment, data security standards, configuration policy, and current security posture. Protection policies can be configured to monitor only, manually block, or automatically block based on certain pre-defined criteria. Each organization's blocking policy can be designed to maximize threat protection independent of any other countermeasures that are deployed whether independently managed or as part of a managed subscription agreement.

By blocking inbound traffic from the malicious IP addresses to the system, network, and/or device being guarded, certain embodiments described herein advantageously impede (e.g., prevent) infiltration of the organization's computer infrastructure from malware. In addition, by blocking outbound traffic from the system, network, and/or device being guarded to the malicious IP addresses, certain embodiments described herein advantageously impede (e.g., prevent) phishing, botnets, social engineering, web application attacks, spam and other unwanted traffic by safeguarding against known malicious actors. By blocking such outbound traffic, certain embodiments described herein advantageously help the system, network, and/or device being guarded to essentially disappear off of the "bad guys'" radar (e.g., the system, network, and/or device being guarded is in "stealth" mode with regard to the potentially dangerous IP address). This type of protection can be especially advantageous when some countries of origin are known for high volumes of dangerous source IP addresses. For example, it has been reported recently that upwards of 55% of global attack traffic originates in Asia. Certain embodiments described herein can help identify such threatening sources, and by running 24 hours a day and seven days a week, can keep its database up-to-date and verified to ensure a low rate of false positives.

Certain embodiments described herein advantageously work alongside and enhance other services that may already be employed for use with uniform resource locator (URL) web and content filtering and email anti-spam services. Rather than replacing such systems, certain embodiments described herein are targeted towards being integrated with the firewall, for example, with intrusion prevention system (IPS), web application firewalls (WAF), and network access control (NAC), so the threat is stopped at the entry and exit point of the guarded network. A continuous closed loop environment can be set up in certain embodiments by further integrating with correlations of firewall logs such that even if there is a bypass of the IP addresses, such incidents will be escalated to assist taking appropriate action.

Certain embodiments provide systems, methods, and/or circuits for protecting guarded network (e.g., network infrastructure) comprising a firewall. For example, a system compatible with certain embodiments can comprise a plurality of log collection devices (e.g., circuits) each in operative communication with the firewall of a guarded network corresponding to the log collection device, a security operation center ("SOC"), and a reputation module (e.g., a computer system comprising at least one processor and at least one memory device) that generates IP reputation information. Other aspects of the disclosure are the log collection device, a method of operating the log collection device, the SOC, a method of operating the SOC, the at least one processor, and a method of operating the reputation module.

In certain embodiments, the log collection device (e.g., circuit) can be configured to communicate with the SOC and can be configured to communicate with the reputation module. The log collection device can further be configured to communicate with the firewall (e.g., can be operationally behind the firewall) and can be configured to receive user input to tailor a level of protection provided to the guarded network to the custom needs of the guarded network. The log collection device can be configured to receive inbound traffic information and outbound traffic information from the firewall and to transmit IP reputation information to the firewall. The firewall can be configured to respond to the IP reputation information received from the log collection device by filtering (e.g., inhibiting, prohibiting, preventing) both the inbound traffic and the outbound traffic between the network and the internet. The log collection device can further be configured to receive the IP reputation information from the reputation module and to transmit the inbound traffic information and the outbound traffic information to the reputation module.

In certain embodiments, the reputation module (e.g., a computer system comprising at least one processor and at least one memory device) can be configured to communicate with the SOC and the log collection device. The reputation module can further be configured to communicate with a plurality (e.g., more than one hundred, more than one thousand) of log collection devices, each guarding a respective network. The reputation module can further be configured to generate the IP reputation information. The generation of the IP reputation information can comprise collecting data from a plurality of intelligence sources (e.g., 20 or more, 30 or more), the data indicative of intelligence regarding potentially dangerous addresses (e.g., source or destination IP addresses, network masks, URLs). The generation of the IP reputation information can further comprise processing (e.g., correlating, unifying, and categorizing) the collected data, and assigning a rating level (e.g., a reputation value) to each potentially dangerous address. The rating level is indicative of the probability that the address is an address of a threatening source. The reputation module can further be configured to transmit the generated IP reputation information to each of the log collection devices which can be configured to use the IP reputation information to guard its respective network.

FIG. 1 schematically illustrates an example computer system 10 (e.g., a reputation module) for protecting a plurality of guarded networks 20 from internet threats in accordance with certain embodiments described herein. Each guarded network 20 of the plurality of guarded networks 20 can comprise at least one firewall 22. The computer system 10 comprises at least one processor 30 in operative communication with a plurality of log collection circuits 40 via the internet 50 and in operative communication with a plurality of intelligence sources 60 via the internet 50. Each log collection circuit 40 of the plurality of log collection circuits 40 is in operative communication with one or more firewalls 22 of a corresponding guarded network 20 of the plurality of guarded networks 20 (e.g., a guarded network 20 that is monitored by the log collection circuit 40). The at least one processor 30 is operative to receive traffic information 42 from each log collection circuit 40 of the plurality of log collection circuits 40. The traffic information 42 is indicative of inbound communications 24 received by the corresponding guarded network 20 from the internet 50 and outbound communications 26 transmitted by the corresponding guarded network 20 to the internet 50. The at least one processor 30 is further operative to receive intelligence data 62 from the plurality of intelligence sources 60. The intelligence data 62 is regarding a plurality of addresses 70 (e.g., IP addresses accessible via the internet). The at least one processor 30 is further operative to generate reputation information 32 regarding one or more addresses 70 of the plurality of addresses 70. The reputation information 32 is generated in response at least to the received traffic information 42 and at least to the received intelligence data 62. The reputation information 32 is indicative of a likelihood (e.g., a probability) for each address 70 that the address 70 is an address of a threatening source. The at least one processor 30 is further operative to transmit the reputation information 32 to each log collection circuit 40 of the plurality of log collection circuits 40. The computer system 10 further comprises at least one memory device 80 that is in operative communication with the at least one processor 30. The at least one memory device 80 is operative to store addresses 44 of the plurality of log collection circuits 40, addresses 64 of the plurality of intelligence sources 60, the received traffic information 42, the received intelligence data 62, and the reputation information 32.

Figure 2:
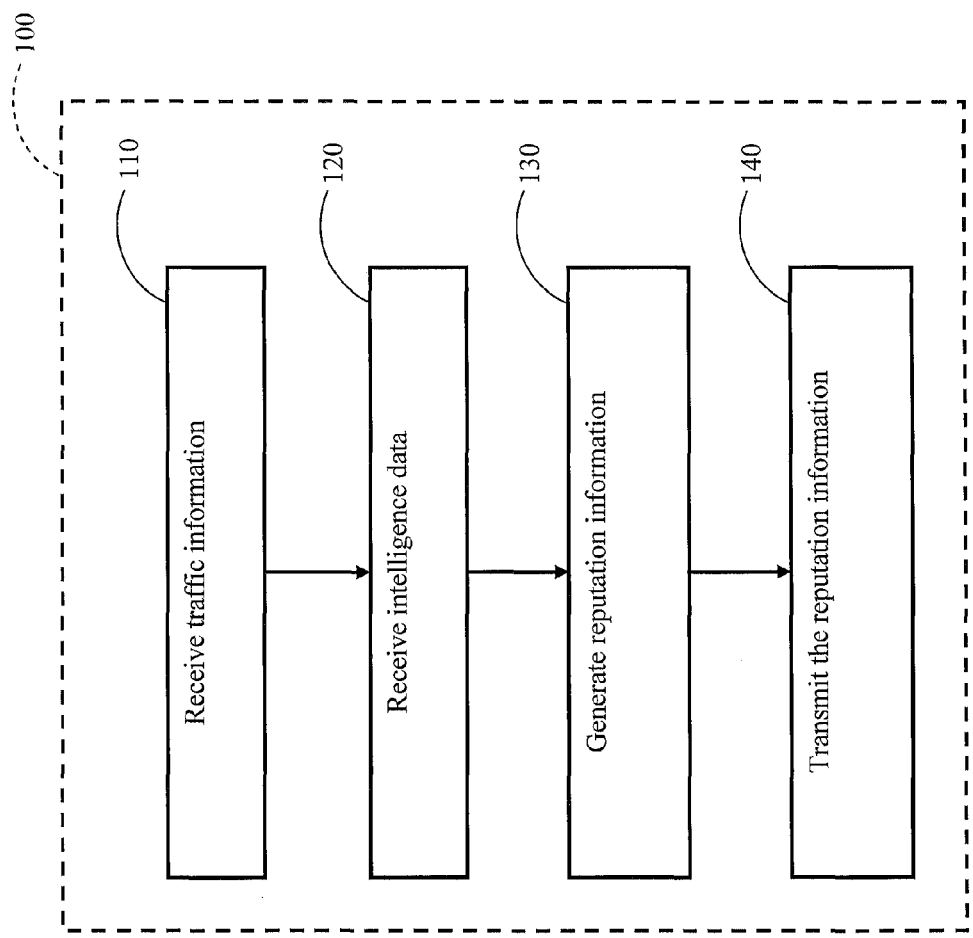
FIG. 2 is a flow diagram of an example method for protecting a plurality of guarded networks from internet threats in accordance with certain embodiments described herein.

FIG. 2 is a flow diagram of an example method 100 for protecting a plurality of guarded networks 20 from internet threats in accordance with certain embodiments described herein. Each guarded network 20 of the plurality of guarded networks 20 comprises at least one firewall 22. In certain embodiments, the example method 100 can also be considered to be a method of operating a reputation module (e.g., operating the computer system 10 of FIG. 1), however, while the method 100 is described below by referencing the configuration of various components shown in FIG. 1, the method 100 may be performed by other configurations of these components, by other components, or by other configurations of these and other components.

In an operational block 110, the method 100 comprises receiving traffic information 42 via the internet 50 from each log collection circuit 40 of a plurality of log collection circuits 40. Each log collection circuit 40 of the plurality of log collection circuits 40 is in operative communication with one or more firewalls 22 of a corresponding guarded network 20 of the plurality of guarded networks 20. The traffic information 42 is indicative of inbound communications 24 received by the corresponding guarded network 20 and outbound communications 26 transmitted by the corresponding guarded network 20. In an operational block 120, the method 100 further comprises receiving intelligence data 62 from a plurality of intelligence sources 60 via the internet 50. The intelligence data 62 is indicative of information regarding a plurality of addresses 70. In an operational block 130, the method 100 further comprises generating reputation information 32 regarding one or more addresses 70 of the plurality of addresses 70. The reputation information 32 is generated in response at least to the received traffic information 42 and at least to the received intelligence data 62. The reputation information 32 is indicative of a likelihood (e.g., a probability) for each address 70 that the address 70 is a threatening source address. In an operational block 140, the method 100 further comprises transmitting the reputation information 32 to each log collection circuit 40 of the plurality of log collection circuits 40.

Figure 3:
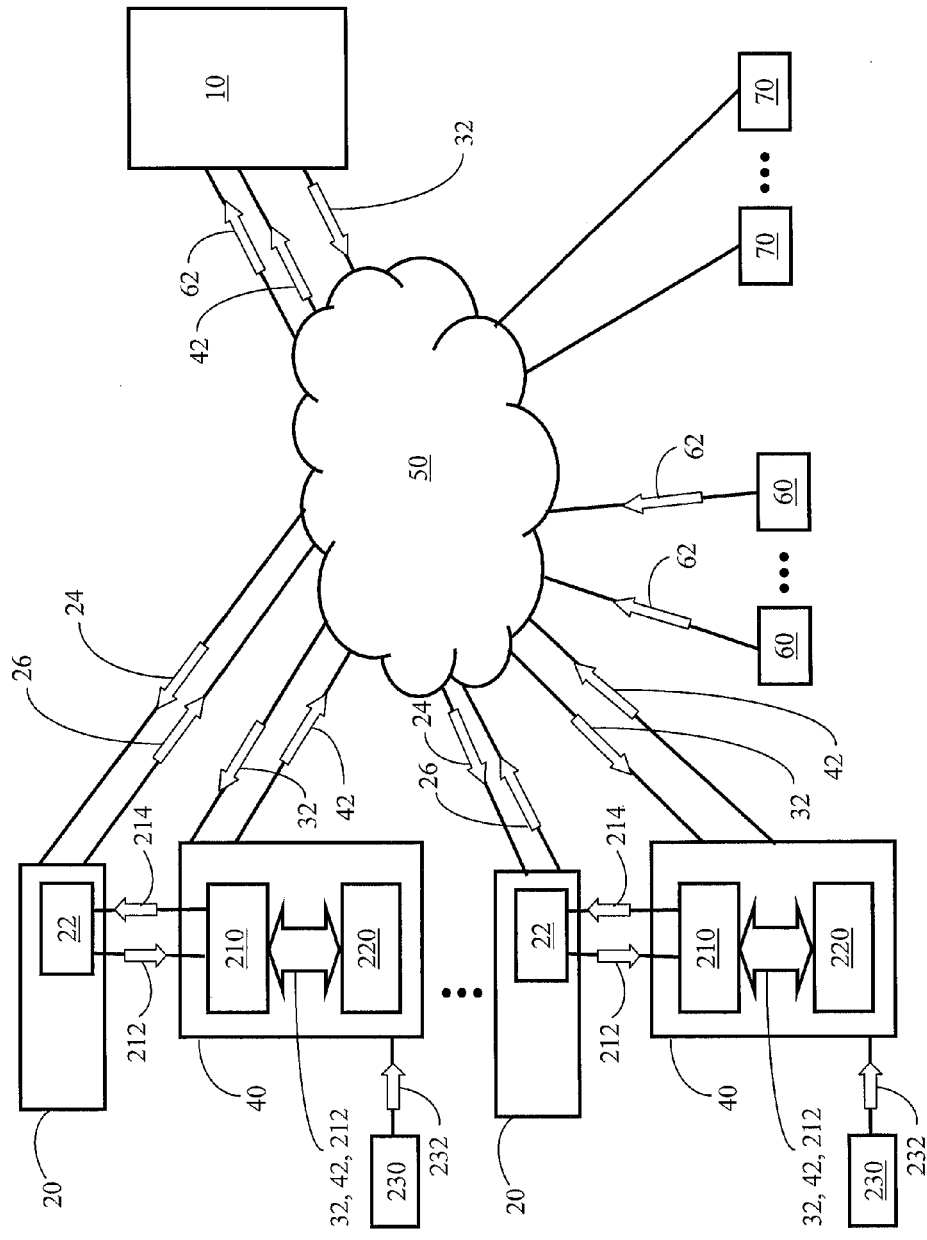
FIG. 3 schematically illustrates an example log collection circuit for protecting a guarded network of a plurality of guarded networks from internet threats in accordance with certain embodiments described herein.

FIG. 3 schematically illustrates an example log collection circuit 40 for protecting a guarded network 20 of a plurality of guarded networks 20 from internet threats in accordance with certain embodiments described herein. The log collection circuit 40 comprises at least one processor 210 in operative communication with a computer system 10 via the internet 50 and in operative communication with the at least one firewall 22 of the guarded network 20. The at least one processor 210 is operative to receive information 212 from the at least one firewall 22 indicative of inbound communications 24 received by the corresponding guarded network 20 from the internet 50 and outbound communications 26 transmitted by the corresponding guarded network 20 to the internet 50. The at least one processor 210 is further operative to generate inbound and outbound traffic information 42 of the guarded network 20 in response to the information 212 received from the at least one firewall 22. The at least one processor 210 is further operative to transmit the traffic information 42 to the computer system 10. The at least one processor 210 is further operative to receive reputation information 32 from the computer system 10. The reputation information 32 is regarding one or more addresses 70 of a plurality of addresses 70 (e.g., IP addresses accessible via the internet). The reputation information 32 is indicative of a likelihood (e.g., probability) for each address 70 that the address 70 is a threatening source address. The at least one processor 210 is further operative to generate control information 214 in response at least to the received reputation information 32. The at least one processor 210 is further operative to transmit the control information 214 to the at least one firewall 22. The log collection circuit 40 further comprises at least one memory device 220 in operative communication with the at least one processor 210. The at least one memory device 220 is operative to store the traffic information 42 and the received reputation information 32. In certain embodiments, the at least one memory device 220 is further operative to store network-specific input 232 received from a communication channel 230.

Figure 4:
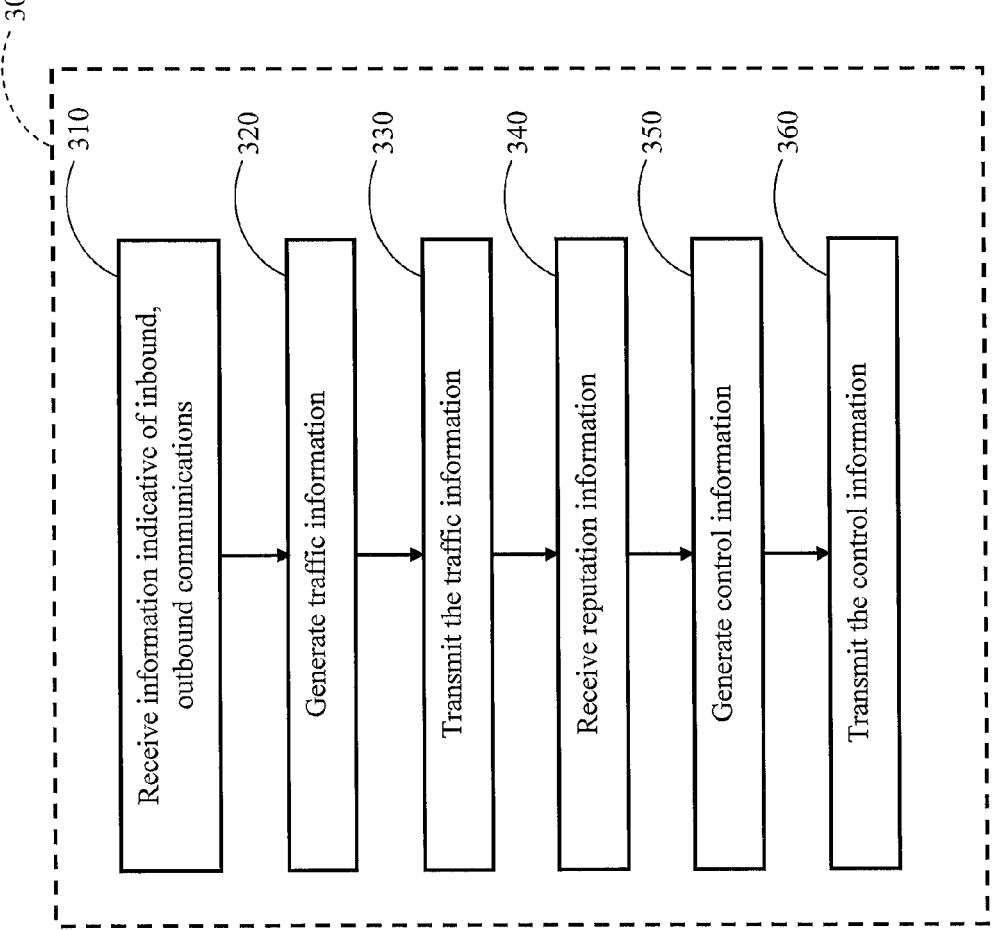
FIG. 4 is a flow diagram of an example method for protecting a guarded network of a plurality of guarded networks from internet threats in accordance with certain embodiments described herein.

FIG. 4 is a flow diagram of an example method 300 for protecting a guarded network 20 of a plurality of guarded networks 20 from internet threats in accordance with certain embodiments described herein. The guarded network 20 comprises at least one firewall 22. In certain embodiments, the example method 300 can also be considered to be a method of operating a log collection circuit 40 (e.g., operating the at least one processor 210 and the at least one memory device 220 of FIG. 3), however, while the method 300 is described below by referencing the configuration of various components shown in FIG. 2, the method 300 may be performed by other configurations of these components, by other components, or by other configurations of these and other components.

In an operational block 310, the method 300 comprises receiving information 212 from the at least one firewall 22 indicative of inbound communications 24 received by the corresponding guarded network 20 from the internet 50 and outbound communications 26 transmitted by the corresponding guarded network 20 to the internet 50. In an operational block 320, the method 300 further comprises generating inbound and outbound traffic information 42 of the guarded network 20 in response to the information 212 received from the at least one firewall 22. In an operational block 330, the method 300 further comprises transmitting the traffic information 42 to a computer system 10 (e.g., a reputation module) via the internet 50. In an operational block 340, the method 300 further comprises receiving reputation information 32 via the internet 50. The reputation information 32 is regarding one or more addresses 70 of a plurality of addresses 70 (e.g., IP addresses accessible via the internet). The reputation information 32 is indicative of a likelihood (e.g., a probability) for each address 70 that the address 70 is a threatening source address. In an operational block 350, the method 300 further comprises generating control information 214 in response at least to the received reputation information 32. In an operational block 360, the method 300 further comprises transmitting the control information 214 to the at least one firewall 22.

In certain embodiments, the guarded network 20 comprises at least one firewall 22 and other infrastructure (e.g., a router 24, devices operatively coupled to the network 20). Examples of the at least one firewall 22 include, but are not limited to, intrusion prevention systems (IPS), web application firewalls (WAF), and network access control (NAC) systems. In certain embodiments, the at least one firewall 22 is positioned between the internet 50 and the other infrastructure of the guarded network 20. The infrastructure of the guarded network 20 communicates with the internet 50 via the inbound communications 24 from the internet 50 to the infrastructure and via the outbound communications 26 from the infrastructure to the internet 50. In certain embodiments, the at least one firewall 22 is configured to respond to the control information 214 by filtering both inbound communications 24 received by the corresponding guarded network 20 from the internet 50 and outbound communications 26 transmitted by the corresponding guarded network 20 to the internet 50. By having both the inbound communications 24 and the output communications 26 flow through and filtered by the at least one firewall 22, threats can advantageously be stopped at the entry and exit point of the guarded network 20.

The at least one processor 30 of the computer system 10 can take a wide variety of forms, including microprocessors, computers, network servers, workstations, personal computers, mainframe computers and the like. The computer system 10 can comprise hardware running software and which will typically include one or more input devices, such as a mouse, trackball, touchpad, and/or keyboard, a display, and computer-readable memory media (e.g., the at least one memory device 80), such as random-access memory (RAM) integrated circuits and data storage devices (e.g., tangible storage, non-transitory storage, flash memory, hard-disk drive). It will be appreciated that one or more portions, or all of the software code may be remote from the user and, for example, resident on a network resource, such as a LAN server, Internet server, network storage device, etc. The software code which configures the hardware to perform in accordance with certain embodiments described herein can be downloaded from a network server which is part of a local-area network or a wide-area network (such as the internet) or can be provided on a tangible (e.g., non-transitory) computer-readable medium, such as a CD-ROM or a flash drive. Various computer languages, architectures, and configurations can be used to practice the various embodiments described herein. For example, in certain embodiments, the computer system 10 can comprise hardware that runs software "in the cloud." The computer system 10 can be configured to collect intelligence data 62 from a plurality of intelligence sources 60 (e.g., via the internet 50 or "in the cloud") and to generate the reputation information 32 in response at least in part to intelligence data 62 from the plurality of intelligence sources 60.

In certain embodiments, the reputation information 32 is generated by the computer system 10 in response at least to the traffic information 42 transmitted by the at least one processor 210 of the log collection circuit 40, the additional traffic information 42 of other guarded networks 20, and the intelligence data 62 from the plurality of intelligence sources 60 regarding the plurality of addresses 70. For example, the computer system 10 can be configured to receive traffic information 42 from each of the plurality of log collection circuits 40 (e.g., more than one hundred, more than one thousand), each guarding one of the various organizations' networks 20. The computer system 10 can also be configured to receive the intelligence data 62 from the plurality of intelligence sources 60 (e.g., 20 or more). The computer system 10 can be configured to use the traffic information 42 to further identify attack trends, newly released threats, and network reconnaissance by supplementing the intelligence data 62 from the plurality of intelligence sources 60.

In certain embodiments, the at least one processor 30 is configured to query the plurality of log collection circuits 40 for the traffic information 42 on a first regular schedule and to query the plurality of intelligence sources 60 for the intelligence data 62 on a second regular schedule. For example, the traffic information 42 can be collected by the at least one processor 30 (e.g., by the at least one processor 30 querying the log collection circuits 40) on a first regular schedule (e.g., every 5 minutes, every 10 minutes, every half-hour, every hour). The intelligence data 62 can be collected by the at least one processor 30 (e.g., by the at least one processor 30 querying the intelligence sources 60 on a second regular schedule (e.g., every hour, every 12 hours, once per day), depending on how often the intelligence sources 60 are refreshed. Thus, in certain embodiments, the reputation information 32 generated by the at least one processor 30 can provide an effectively "real-time" perspective of the current threats to the network 20.

In certain embodiments, the reputation information 32 is continuously updated by the computer system 10 and can be provided to the log collection circuits 40 as a continuously updated feed of known and suspected malicious addresses that are used by the log collection circuits 40 to direct the respective firewalls 22 to filter (e.g., inhibit, prohibit, prevent, block) potentially dangerous inbound and outbound traffic. In certain embodiments, the reputation information 32 reflects the latest up-to-the-minute threat intelligence which is used to identify security threats and to protect the guarded networks 20 from these security threats. For example in certain embodiments, the reputation information 32 is updated 24 hours a day and seven days a week, such that the plurality of addresses 70 confirmed or suspected to be addresses of threatening sources is kept up-to-date and verified to ensure a low rate of false positives.

The computer system 10 can be configured to correlate, unify, and categorize the received traffic information 42 and the intelligence data 62, and to respond to the traffic information 42 and the intelligence data 62 by generating the reputation information. Generating the reputation information can include assigning a rating level (e.g., a reputation value) to each address 70 (e.g., IP address, network mask, or URL) of the plurality of addresses 70. For example, the rating level can be determined by assigning different weighting values to the entries of the different intelligence sources 60, with the weighting values indicative of the relative danger represented by the entries. The received traffic information 42 and intelligence data 62 can include a significant amount of duplication from the various sources of this information, and the computer system 10 in certain embodiments can be configured to produce the reputation information 32 to be communicated to the log collector circuits 40 with these duplications reduced (e.g., removed, eliminated), thereby simplifying the reputation information 32 and facilitating its communication to the log collection circuits 40. In the case of IP addresses, if a substantial fraction of a network is considered as potentially dangerous, rather than including a listing of each IP addresses of the network to be blocked, the complete network can be identified to be blocked, thereby further reducing the size of the reputation information 32.

In certain embodiments, the reputation information 32 comprises a plurality of reputation values, with each reputation value corresponding to an address 70 of the plurality of addresses 70 and indicative of the likelihood that the address is a threatening source address. For example, the reputation information 32 can advantageously include a list of addresses 70 (e.g., IP addresses) and a list of corresponding reputation values for the addresses 70 that are indicative of the likelihood (e.g., probability) that the address 70 is an address of a threatening source. The reputation information 32 can assign a negative reputation value to an address 70 that is determined to have a substantial probability of being an address of a threatening source, and a positive reputation value to an address 70 that is determined to have a low or insubstantial probability of being an address of a threatening source. For example, addresses 70 can be assigned a negative reputation value when they are found to be open proxies or when they send high levels of spam or viruses to spam traps and users. The magnitudes of the negative reputation values and positive reputation values can be indicative of the relative probabilities of the corresponding addresses 70 being an address of a threatening source or not. Various other schemes (e.g., reputation values across a scale of 0-100, where low and high values differentiate between addresses of low and high probabilities of being an address of a threatening source) may also be used.

The at least one processor 210 of the log collection circuit 40 can take a wide variety of forms, including microprocessors, computers, network servers, workstations, personal computers, mainframe computers and the like. The log collection circuit 40 can comprise hardware running software and which will typically include one or more input devices, such as a mouse, trackball, touchpad, and/or keyboard, a display, and computer-readable memory media (e.g., the at least one memory device 220), such as random-access memory (RAM) integrated circuits and data storage devices (e.g., tangible storage, non-transitory storage, flash memory, hard-disk drive). It will be appreciated that one or more portions, or all of the software code may be remote from the user and, for example, resident on a network resource, such as a LAN server, Internet server, network storage device, etc. The software code which configures the hardware to perform in accordance with certain embodiments described herein can be downloaded from a network server which is part of a local-area network or a wide-area network (such as the internet) or can be provided on a tangible (e.g., non-transitory) computer-readable medium, such as a CD-ROM or a flash drive. Various computer languages, architectures, and configurations can be used to practice the various embodiments described herein. In certain embodiments, each log collection circuit 40 of the plurality of log collection circuits 40 is operationally behind the one or more firewalls 22 of the corresponding guarded network 20.

Each log collection circuit 40 of the plurality of log collection circuits 40 can communicate with the computer system 10 to receive the reputation information 32 from the computer system 10. Each log collection circuit 40 of the plurality of log collection circuits 40 is responsive to the reputation information 32 by controlling the one or more firewalls 22 to protect the corresponding guarded network 20 from threatening sources. For example, once a log collection circuit 40 has been deployed into the organization's environment and has received the particular configuration to be used, the log collection circuit 40 can query the computer system 10 to retrieve an initial set of reputation information 32 (e.g., a list of IP addresses and networks to be blocked). The log collection circuit 40 can then generate and run a script to configure the organization's network 20 (e.g., the at least one firewall 22) to perform the appropriate filtering based on the particular configurations of the particular devices. Thus, in certain embodiments, each log collection circuit 40 of the plurality of log collection circuits 40 is responsive to the reputation information 32 by controlling the one or more firewalls 22 to filter inbound communications received by the corresponding guarded network 20 from the internet 50 and to filter outbound communications transmitted by the corresponding guarded network 20 to the internet 50.

In order to minimize traffic between the log collection circuit 40 and the computer system 10, each new subsequent request for reputation information 32 made by the log collection circuit 40 can retrieve only any modifications that have been made to the reputation information 32 since the previous such request from the log collection circuit 40. If the protection policy related to a device on the guarded network 20 is changed significantly, the log collection circuit 40 can apply the changes during off-business hours to avoid overloading the guarded network 20 and devices.

In certain embodiments, the log collection circuit 40 can communicate with the computer system 10 to provide the computer system 10 with traffic information 42 (e.g., statistics) regarding the traffic to and from the guarded network 20. The traffic information 42 can include, but is not limited to: a log of outgoing connections blocked, a log of incoming connections blocked, and memory usage of the log collection circuit 40. The traffic information 42 can be used by the computer system 10 or by the log collection circuit 40 to produce comprehensive reports regarding the performance of the log collection circuit 40, the computer system 10, or the overall system. These reports can be accessed by the organization directly from the log collection circuit 40 or through a separate portal.

In certain embodiments, the information 212 regarding inbound and outbound communications and the control information 214 can be communicated between the log collection circuit 40 and the at least one firewall 22 via a secure socket layer ("SSL") connection. In certain embodiments, the reputation information 32 and the traffic information 42 can be communicated between the log collection circuit 40 and the computer system 10 via a secure socket layer/transfer layer security ("SSL/TLS") connection.

In certain embodiments, the log collection circuit 40 can comprise a communication channel 230 (e.g., a user input channel) configured to provide network-specific input 232 (e.g., from the user) that is indicative of protection to be provided to the corresponding guarded network 20. The network-specific input 232 can be used by the log collection circuit 40 to customize the control information 214 transmitted by the log collection circuit 40 to the respective at least one firewall 22 (e.g., to tailor the level of protection to the custom needs of the organization) according to one or more of the following: the organization's network environment, data security standards, configuration policy, and current security posture. The at least one processor 210 can be configured to generate the control information 214 in response to at least the network-specific input 232. For example, the guarded network 20 can comprise a plurality of devices and the network-specific input 232 can comprise information regarding a plurality of protection levels corresponding to the plurality of devices of the guarded network 20 (e.g., to provide device-specific protection levels according to the organization's preferences for such protection). The control information 214 can correspond to protection policies that are configured to monitor only, to manually block, or to automatically block communications with addresses 70 based on certain pre-defined criteria (e.g., criteria defined by the network-specific input 232). The control information 214 can be compatible with the organization's blocking policy and can be designed to maximize threat protection independent of any other countermeasures that are deployed whether independently managed or a part of a managed subscription agreement. In certain embodiments, the at least one memory device 220 is configured to store network-specific input 232 received from a communication channel 230.

In certain embodiments, the plurality of intelligence sources 60 can comprise a plurality of attacker intelligence sources or datafeeds (e.g., 20 or more). For example, the plurality of intelligence sources 60 can comprise private and/or publicly available attack sources and datafeeds, specialized and/or broadly recognized attack sources and data feeds. For example, the intelligence data 62 can comprise IP and URL reputation information regarding a plurality of addresses 70. Example intelligence sources 60 include, but are not limited to, the following:

Abuse.ch—Zeus tracker domains
Abuse.ch—Zeus tracker IP
Abuse.ch—SpyEye tracker domains
Abuse.ch—SpyEye tracker IP
Abuse.ch—Palevo tracker combined list
Abuse.ch—Feodo tracker domain
Abuse.ch—Feodo tracker IP
DShield—Suspicious domains (Medium)
PhishTank—Verified domains
AlienVault—IP Reputation
Emerging Threats—IP Reputation
Emerging Threats—Domain Reputation
Symantec Deep Sight—IP Reputation
Symantec Deep Sight—Host Reputation
URLBlacklist.com
Senderscore.org
Trustedsource.org
Projecthoneypot.org
Sorbs.net
Ipillion.com
Seclists.org
MaxMind.com In certain embodiments, the listed addresses 70 in the intelligence data 62 can include, but is not limited to, threatening sources such as: malware and command and control IP and URL lists, spam generators, phishing hosts, botnets, attacks launched from illegal or private address space, traffic that originates from countries and sources that may be associated with criminal networks, and brute forcers. In certain embodiments, the plurality of addresses 70 can comprise one or more of the following: internet protocol (IP) addresses (e.g., source IP addresses, destination IP addresses), network masks, and uniform resource locators (URLs). The plurality of addresses 70 can comprise addresses of devices (e.g., networks, servers, computers, circuits, processors, etc.) that are operatively coupled to the internet 50 such that the devices are accessible via the device addresses 70 by other devices operatively coupled to the internet 50. For example, the addresses 70 can be for devices which can transmit inbound communications 24 to a guarded network 20 via the internet 50, which can receive outbound communications 26 from a guarded network 20 via the internet 50, or both.

The communication packets received or transmitted via the internet 50 each have a source address and a destination address, which can be detected by the at least one firewall 22 of a guarded network 20 and can be used by the at least one firewall 22 for filtering (e.g., inhibiting, prohibiting, preventing, blocking) inbound communications 24 from selected addresses 70, outbound communications 26 to selected addresses 70, or both. These selected addresses 70 can be addresses that are known to be, suspected to be, known to be affiliated with, or suspected to be affiliated with malicious devices or threatening sources, and can be identified as such in the reputation information 32 from the computer system 10. For example, at least some of these selected addresses 70 can be affiliated with countries of origin that are known for high volumes of dangerous source IP addresses. Examples of malicious devices or threatening sources include, but are not limited to, botnets, remotely controlled hosts, keylogger sources, Trojan sources, virus sources, worms, malware sources, spyware sources, encrypted tunnels, phishing sources, zero day threat sources, social engineering sources, web application attack sources, and honeypots.

Example 1

Figure 5:
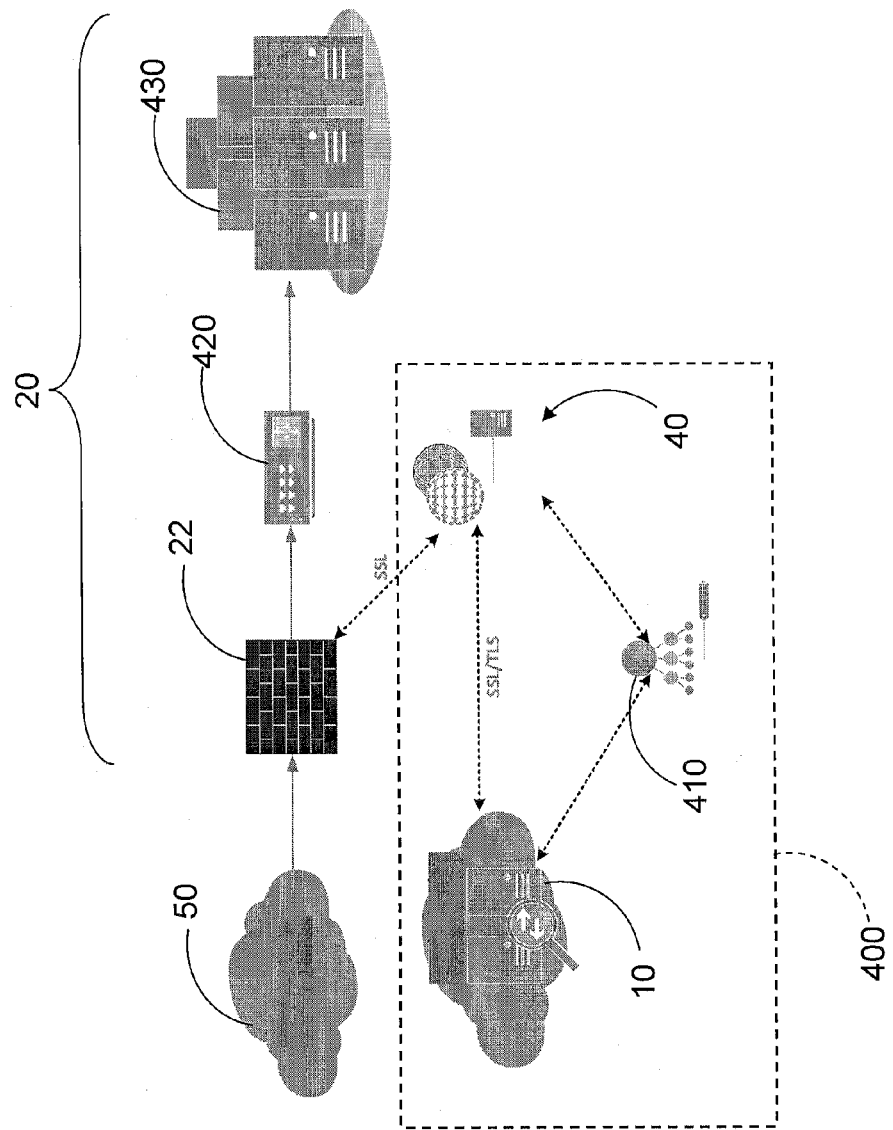
FIG. 5 schematically illustrates an example system operatively coupled to an example organization's computer network in accordance with certain embodiments described herein.

FIG. 5 schematically illustrates an example system 400 operatively coupled to an example organization's computer network 20 in accordance with certain embodiments described herein. The system 400 comprises a log collection circuit 40, a computer system 10 (e.g., a reputation module), and a security operation center ("SOC") 410 (e.g., a 24-hours-a-day, 7-day-a-week monitoring service). The example network 20 comprises a firewall 22, a router 420, and other internal infrastructure 430.

In the example network 20 of FIG. 5, the firewall 22 is operatively coupled to the internet 50 and to the router 420, and the router 420 is operatively coupled to the other internal infrastructure 430. The infrastructure 430 communicates with the internet 50 via inbound communications 24 from the internet 50 to the infrastructure 430 and via outbound communications 26 from the infrastructure 430 to the internet 50. Both the inbound communications 24 and the outbound communications 26 flow through both the firewall 22 and the router 420. The firewall 22 is configured to communicate with the log collection circuit 40 (e.g., to provide information 212 regarding the inbound and outbound communications to the log collection circuit 40 and to receive control information 214 from the log collection circuit 40). Communications between the firewall 22 and the log collection circuit 40 can be via a secure socket layer ("SSL") connection. The firewall 22 is further configured to respond to the control information 214 by filtering (e.g., inhibiting, prohibiting, preventing, blocking) at least a portion of one or both of the inbound communications 24 traffic and the outbound communications 26 traffic between the infrastructure 430 and the internet 50.

In the example system 400 of FIG. 5, the log collection circuit 40 is operatively coupled to the computer system 10 (e.g., via the internet 50) and is operatively coupled to the SOC 410 (e.g., via the internet 50). Communications between the log collection circuit 40 and the computer system 10 can be via a secure socket layer/transfer layer security ("SSL/TLS") connection, as shown in FIG. 5.

The log collection circuit 40 can be operationally behind the firewall 22 and can be configured to tailor the level of protection to the custom needs of the organization. For example, the log collection circuit 40 can provide the organization with the ability to configure the level of protection for each one of the devices of the organization's network (e.g., the devices of the infrastructure 430) in response to user input regarding the organization's preferences for such protection. Each configuration or "protection policy" for a given device can be personalized with a different protection level for each category of threat and/or for each geographic region. For example, each category (e.g., including, but are not limited to: malware command and control servers, botnets, spam sources, spyware, and scanners) can be assigned a protection level (e.g., from 1 to 10) depending on the amount of risk that such threats present to the device. In addition, each geographic region (e.g., by hemisphere, continent, country, island, state, commonwealth, administrative region, autonomous region, metropolitan region, city) can be assigned a protection level (e.g., from 1 to 10) depending on the amount of risk that communications to/from the geographic region present to the device. The organization can also add "whitelists" (e.g., lists of IP addresses that are to be considered safe regardless of the reputation information 32, such that communications with the whitelisted IP addresses are not filtered) and/or "blacklists" (e.g., lists of IP addresses that are to be considered dangerous regardless of the reputation information 32, such that communications with the blacklisted IP addresses are filtered). These whitelists and blacklists can also include geographic regions which are considered to be safe or dangerous, respectively. In this way, the log collection circuit 40 can be implemented strategically as part of the organization's overarching securing plan, rather than as a "one-off" or side note, to provide the ability to customize the level of protection.

Example 2

Figure 6:
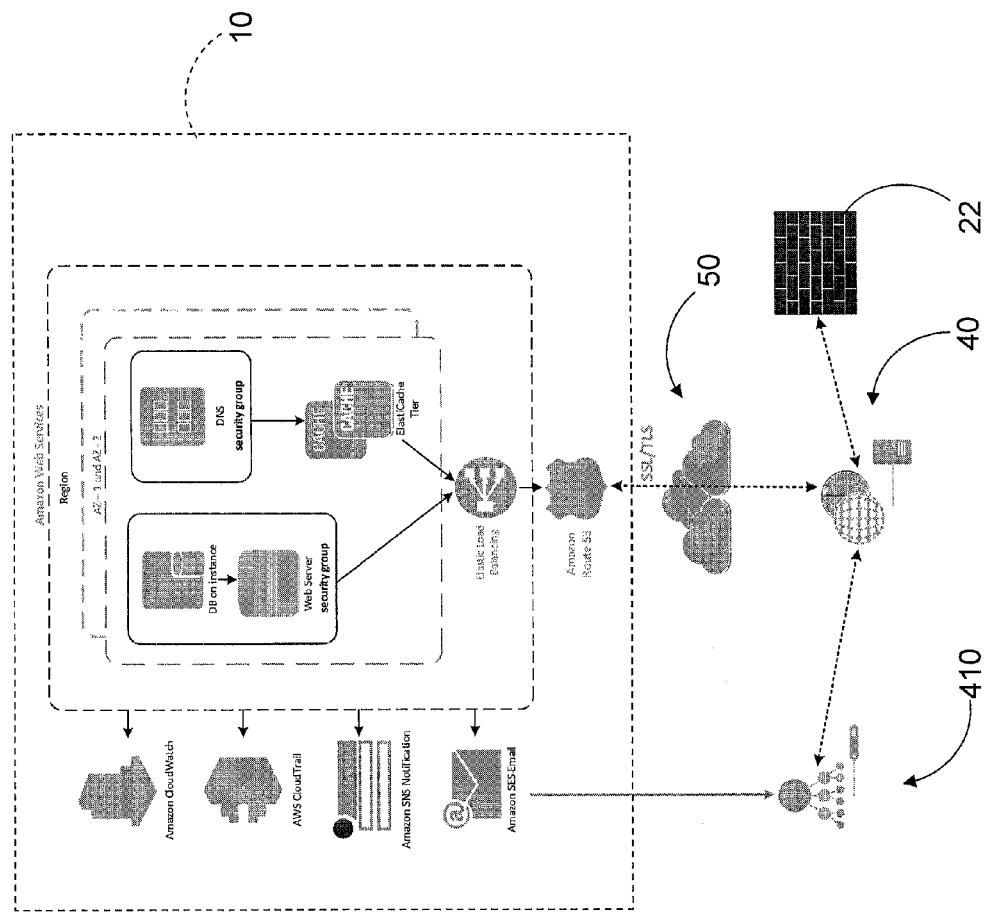
FIG. 6 schematically illustrates an example computer system compatible with certain embodiments described herein.

FIG. 6 schematically illustrates an example computer system 10 compatible with certain embodiments described herein. The computer system 10 of FIG. 6 is utilized with third-party web services (e.g., web services provided by Amazon). As shown in FIG. 6, there can be multiple components to the computer system 10. For example, in FIG. 6, there are two specific components to the computer system 10: an IP reputation service and a DNS (Domain Name Service) reputation service (e.g., both provided by at least one processor 30 of the computer system 10). These two reputation services can be hosted on a third-party web service, such as the Amazon Web Services (AWS). For example, the reputation services can be in a separate security zone in two different Amazon locations for redundancy and can include load balancing to make sure they are available with "five 9's" availability (99.999%). The IP reputation service can reside on the AWS as an application that runs at regular intervals (e.g., every hour) to collect the IP reputation information from the various intelligence sources 60 to get the latest IP and DNS listing of the blacklisted IP or DNS names. This IP reputation information can then be compiled and stored in a database server (e.g., the at least one memory device 80 of the computer system 10) which also resides on the AWS environment.

The log collection circuits 40 (e.g., log collection servers comprising the at least one processor 210 and hosted within each client environment at the client location) can collect these updated lists at regular intervals (e.g., every two hours). Each log collector circuit 40 can be a physical server provided by the service provider and can perform multiple functions. Each of these functions can be a separate task, can function seamlessly together, and can cache information (e.g., in the at least one memory device 220 of the log collection circuit 40) in case of any network outages at the client site. Examples of such functions include, but are not limited to the following:

Information collection: For example, information collection can be performed by an application that is installed on the log collection circuit 40 (e.g., on the at least one processor 210) to connect to the computer system 10 in the AWS to collect the latest list of IP addresses via an SSL connection to the web server. Once the information has been downloaded, the log collection circuit 40 can then update the respective local client firewall 22 with the changes that it has received from the computer system 10 in the AWS. The log collection circuit 40 can also back up the confirmation of the existing firewall 22 (e.g., in the at least one memory device 220) before it makes the change to make sure that it has complete configuration details.

Anti-virus protection: For example, anti-virus protection can be performed by an application that runs constantly on the log collection circuit 40 (e.g., on the at least one processor 210) to protect the log collection circuit 40 and/or its operating system from any virus attacks.

Mediator service: For example, a third-party application (e.g., from LogRhythm of Boulder, Colo.) can run on the at least one processor 210 and can collect all the logs of incoming and outgoing communication traffic from the client environment, compress these logs, and send the compressed logs to the SOC 410 via SSL to have these logs analyzed and processed.

Log analysis: For example, an application run on the at least one processor 210 and can analyze the logs from the log collection circuit 40 regarding the traffic to/from the client firewall 22 for any issues related to allowing traffic or denying traffic (e.g., "Allow and Deny") based on the blacklisted IP addresses. The application can be configured and modified to check for the logs that are received from the firewall 22 and compared in real-time with the list of allowed IP addresses and the list of denied IP addresses. For example, if any traffic to/from IP addresses on the denied list is found to be passed through or if any traffic to/from IP addresses on the allowed list has been blocked, such events can then be escalated to the an event correlation engine of the SOC 410 as an alert (e.g., via an SSL connection to the SOC 410). This information can then be displayed on a security analyst console for engineers monitoring the SOC 410 to review and analyze for either escalation of the issue to the client or to take remediation action to fix the configuration on the firewall 22.

Figure 7:
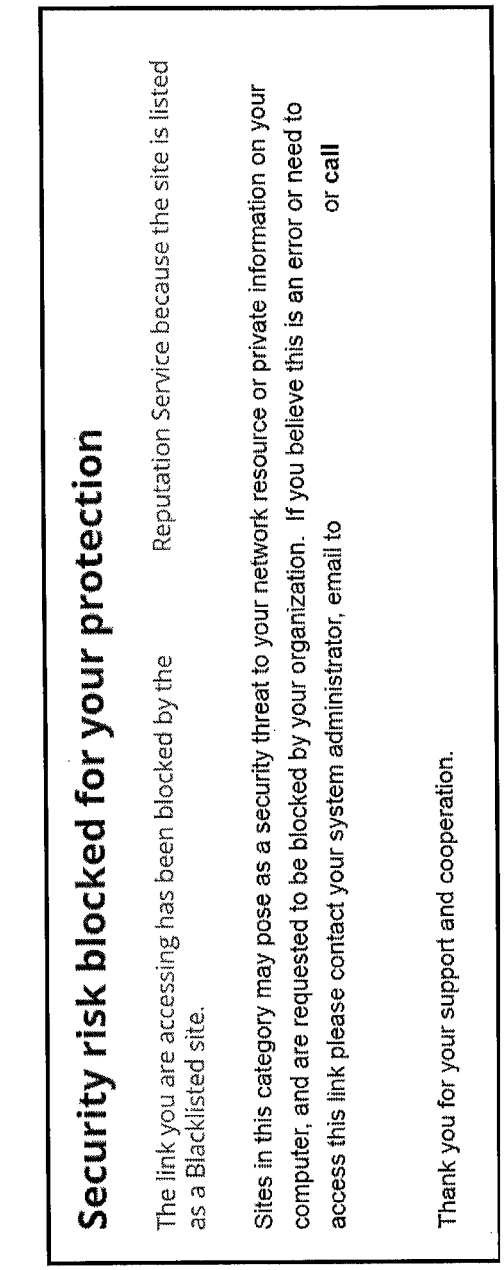
FIG. 7 shows an example notification compatible with certain embodiments described herein.

The DNS reputation service can be configured on the AWS so that it is directly configured to be the primary and secondary DNS resolution service for the specific client. In certain such embodiments, the client systems can be configured such as all the name resolution requests are forwarded to the DNS reputation service for resolution before they are redirected to the appropriate websites. If the DNS is found to be on a blacklist, the user can be presented with a web page stating that the user has reached a blacklisted site and instructing the user that if this is an error, to please contact support. FIG. 7 shows an example notification compatible with certain embodiments described herein. The DNS resolution service can filter bad domain names (e.g., blacklisted domain names), and the blacklist domains can be correlated from the same intelligence sources from which the blacklisted IP addresses are gathered.

The SOC 410 can be configured to communicate with a plurality (e.g., more than one hundred, more than one thousand) of log collection circuits 40, each guarding a respective network 20, and is configured to communicate with the computer system 10. For example, the SOC 410 can receive the log information from the plurality of log collection circuits 40 and can receive the reputation information 32 from the computer system 10. The SOC 410 can further be configured to continually monitor the log information and the reputation information 32 in real-time, 24 hours a day, 7 days a week. The SOC 410 can be further configured to detect new or rapidly changing threats on the internet 50 that may endanger the network 20. Upon detecting an event or trend of sufficient interest, the SOC 410 can send an alert to some or all of the plurality of log collection circuits 40 indicative of the event or trend. The log collection circuits 40 that receive such an alert can transmit appropriate information to the respective firewalls 22 to appropriately filter the inbound and outbound traffic in view of the event or trend.

The SOC 410 can also transmit commands to the computer system 10 (e.g., to revise the list of intelligence sources to be accessed in compiling the reputation information).

In certain embodiments, the SOC 410 can comprise one or more computer modules that are configured to automatically provide such monitoring of the log information and the reputation information 32. In certain other embodiments, the SOC 410 can comprise one or more computers that are configured to provide information to human operators that are monitoring the log information and the reputation information 32 and that are configured to generate and transmit the alerts in response to input provided by the human operators. For example, the SOC 410 can perform client-defined escalation procedures based on the requirements and security posture of each client. The SOC 410 can also collect relevant information like the network topology which it can import within in its monitoring tool to help in the correlation of the events generated from the respective firewall syslogs. The SOC 410 can be operational 24 days×7 days a week×365 days a year and can help the client in identifying issues and making recommendations to help fix the related incidents with client support. In certain embodiments in which the SOC 410 does not have the credentials to make any changes, the client systems administrator or other relevant personnel can help in the process. When the SOC 410 discovers multiple attacks or some device that is accessing a blacklisted IP or DNS on a constant or random interval, the SOC 410 (e.g., an analyst using the SOC 410) can either escalate the issue to the client (e.g., sending an alert to the client, conducting a call or a web conference with the client, or otherwise communicating with the relevant client administrator) to help the client identify the source of the event and to remediate the issue, based on the client ability and a previously agreed-upon set-up.

Although described above in connection with particular embodiments, it should be understood the descriptions of the embodiments are illustrative of the invention and are not intended to be limiting. Various modifications and applications may occur to those skilled in the art without departing from the true spirit and scope of the invention.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, computing devices may be configured to implement the processes, algorithms and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer system for protecting a plurality of guarded networks from Internet threats, each guarded network of the plurality of guarded networks comprising at least one firewall, the system comprising:
    at least one processor in operative communication with a plurality of log collection circuits via the Internet and in operative communication with a plurality of intelligence sources via the Internet, each log collection circuit of the plurality of log collection circuits in operative communication with one or more firewalls of a corresponding guarded network of the plurality of guarded networks and comprising at least one first memory device operative to store traffic information of the corresponding guarded network, the at least one processor operative to:
        receive the traffic information from each log collection circuit of the plurality of log collection circuits, the traffic information comprising information regarding memory usage of the at least one first memory device of the log collection circuit and information regarding outbound or incoming communications blocked by the one or more firewalls;
        receive intelligence data from the plurality of intelligence sources, the intelligence data regarding a plurality of addresses;
        generate reputation information regarding one or more addresses of the plurality of addresses, the reputation information generated in response at least to the received traffic information and at least to the received intelligence data, the reputation information indicative of a likelihood for each address that the address is an address of a threatening source; and
        transmit the reputation information to each log collection circuit of the plurality of log collection circuits; and
    at least one second memory device in operative communication with the at least one processor, the at least second one memory device operative to store addresses of the plurality of log collection circuits, addresses of the plurality of intelligence sources, the received traffic information, the received intelligence data, and the reputation information.

2. The system of claim 1, wherein each log collection circuit of the plurality of log collection circuits is responsive to the reputation information by controlling the one or more firewalls to protect the corresponding guarded network from threatening sources.

3. The system of claim 1, wherein each log collection circuit of the plurality of log collection circuits is responsive to the reputation information by controlling the one or more firewalls to filter inbound communications received by the corresponding guarded network from the Internet and to filter outbound communications transmitted by the corresponding guarded network to the Internet.

4. The system of claim 1, wherein each log collection circuit of the plurality of log collection circuits is operationally behind the one or more firewalls of the corresponding guarded network.

5. The system of claim 1, wherein the plurality of addresses comprises one or more of the following: source IP addresses, destination IP addresses, network masks, domain name service listings, and URLs.

6. The system of claim 1, wherein the reputation information comprises a plurality of reputation values, each reputation value corresponding to an address of the plurality of addresses and indicative of the likelihood that the address is a threatening source address.

7. The system of claim 1, wherein the at least one processor is configured to query the plurality of log collection circuits for the traffic information on a first regular schedule and to query the plurality of intelligence sources for the intelligence data on a second regular schedule.

8. A method for protecting a plurality of guarded networks from Internet threats, each guarded network of the plurality of guarded networks comprising at least one firewall, the method comprising:
  receiving traffic information via the Internet from each log collection circuit of a plurality of log collection circuits, each log collection circuit of the plurality of log collection circuits in operative communication with one or more firewalls of a corresponding guarded network of the plurality of guarded networks and comprising at least one memory device operative to store the traffic information of the corresponding guarded network, the traffic information comprising information regarding memory usage of the at least one memory device and information regarding outbound or incoming communications blocked by the one or more firewalls;
  receiving intelligence data from a plurality of intelligence sources via the Internet, the intelligence data indicative of information regarding a plurality of addresses;
  generating reputation information regarding one or more addresses of the plurality of addresses, the reputation information generated in response at least to the received traffic information and at least to the received intelligence data, the reputation information indicative of a likelihood for each address that the address is a threatening source address; and
  transmitting the reputation information to each log collection circuit of the plurality of log collection circuits.

9. The method of claim 8, wherein each log collection circuit of the plurality of log collection circuits is responsive to the reputation information by controlling the one or more firewalls to filter inbound communications received by the corresponding guarded network from the Internet and to filter outbound communications transmitted by the corresponding guarded network to the Internet.

10. The method of claim 8, wherein each log collection circuit of the plurality of log collection circuits is operationally behind the one or more firewalls of the corresponding guarded network.

11. The method of claim 8, wherein the plurality of addresses comprises one or more of the following: source IP addresses, destination IP addresses, network masks, domain name service listings, and URLs.

12. The method of claim 8, wherein the reputation information comprises a plurality of reputation values, each reputation value corresponding to an address of the plurality of addresses and indicative of the likelihood that the address is a threatening source address.

13. The method of claim 8, further comprising querying the plurality of log collection circuits for the traffic information on a first regular schedule and querying the plurality of intelligence sources for the intelligence data on a second regular schedule.

14. A log collection circuit for protecting a guarded network of a plurality of guarded networks from Internet threats, the guarded network comprising at least one firewall, the circuit comprising:
  at least one processor in operative communication with a computer system via the Internet and in operative communication with the at least one firewall of the guarded network, the at least one processor operative to:
    receive information from the at least one firewall indicative of inbound communications received by the corresponding guarded network from the Internet and outbound communications transmitted by the corresponding guarded network to the Internet;
    generate inbound and outbound traffic information of the guarded network in response to the information received from the at least one firewall;
    transmit the traffic information to the computer system;
    receive reputation information from the computer system, the reputation information regarding one or more addresses of a plurality of addresses, the reputation information indicative of a likelihood for each address that the address is a threatening source address;
    generate control information in response at least to the received reputation information; and
    transmit the control information to the at least one firewall; and
  at least one memory device in operative communication with the at least one processor, the at least one memory device operative to store the traffic information and the received reputation information, the traffic information comprising information regarding memory usage of the at least one memory device and information regarding outbound or incoming communications blocked by the at least one firewall.

15. The circuit of claim 14, further comprising a communication channel configured to receive network-specific input indicative of protection to be provided to the corresponding guarded network, wherein the at least one processor is further configured to generate the control information in response at least to the network-specific input.

16. The circuit of claim 15, wherein the guarded network comprises a plurality of devices and the network-specific input comprises information regarding a plurality of protection levels corresponding to the plurality of devices of the guarded network.

17. The circuit of claim 15, wherein the at least one memory device is further operative to store the network-specific input.

18. The circuit of claim 14, wherein the at least one firewall is configured to respond to the control information by filtering both inbound communications received by the corresponding guarded network from the Internet and outbound communications transmitted by the corresponding guarded network to the Internet.

19. The circuit of claim 14, wherein the reputation information is generated by the computer system in response at least to the traffic information transmitted by the at least one processor, additional traffic information of other guarded networks, and intelligence data regarding the plurality of addresses.

20. The circuit of claim 14, wherein the at least one processor is operationally behind the at least one firewall of the guarded network.

* * * * *